US009705345B2

United States Patent
Luo et al.

(10) Patent No.: US 9,705,345 B2
(45) Date of Patent: Jul. 11, 2017

(54) BATTERY PROTECTION CIRCUIT USED IN ELECTRONIC DEVICE

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Zong-Xiao Luo, Shenzhen (CN); An-An Pan, Shenzhen (CN)

(73) Assignees: Fu Tai Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 539 days.

(21) Appl. No.: 14/261,832

(22) Filed: Apr. 25, 2014

(65) Prior Publication Data
US 2015/0188307 A1 Jul. 2, 2015

(30) Foreign Application Priority Data
Dec. 27, 2013 (CN) .......................... 2013 1 0731912

(51) Int. Cl.
H02H 5/04 (2006.01)
H02J 7/00 (2006.01)

(52) U.S. Cl.
CPC ............ *H02J 7/0031* (2013.01); *H02H 5/047* (2013.01)

(58) Field of Classification Search
CPC ......... H02J 7/0031; H02H 5/04; H02H 5/042; H02H 5/047
USPC ...................................................... 361/93.8
See application file for complete search history.

(56) References Cited

U.S. PATENT DOCUMENTS

| 2008/0150488 A1* | 6/2008 | Lu | H02J 7/0031 320/134 |
| 2009/0058365 A1* | 3/2009 | Goto | H01M 10/44 320/134 |
| 2009/0179618 A1* | 7/2009 | LiTingTun | H02J 7/0031 320/136 |
| 2009/0257164 A1* | 10/2009 | Ikeuchi | H02J 7/0031 361/91.5 |
| 2011/0169458 A1* | 7/2011 | Sugiura | H02J 7/0031 320/134 |
| 2011/0291613 A1* | 12/2011 | Rosik | H01M 10/443 320/108 |

FOREIGN PATENT DOCUMENTS

TW 200842389 A 11/2008

* cited by examiner

*Primary Examiner* — Zeev V Kitov
(74) *Attorney, Agent, or Firm* — Steven Reiss

(57) ABSTRACT

A battery protection circuit of an electronic device having a battery includes a first switch component, a temperature detection unit, an amplifier, a comparator, and a controller. The first switch component is connected between an input voltage and the battery, to charge the battery. The temperature detection unit detects a temperature of the battery, and converts the temperature into a voltage signal. The amplifier is connected to the comparator to amplify the voltage signal and output the amplified voltage signal to the comparator. The comparator is connected to the controller to compare the amplified voltage signal with a reference voltage Vref. The controller is connected to the first switch component to turn off the first switch component to stop charging the battery when the amplified voltage signal is greater than the reference voltage Vref.

12 Claims, 1 Drawing Sheet

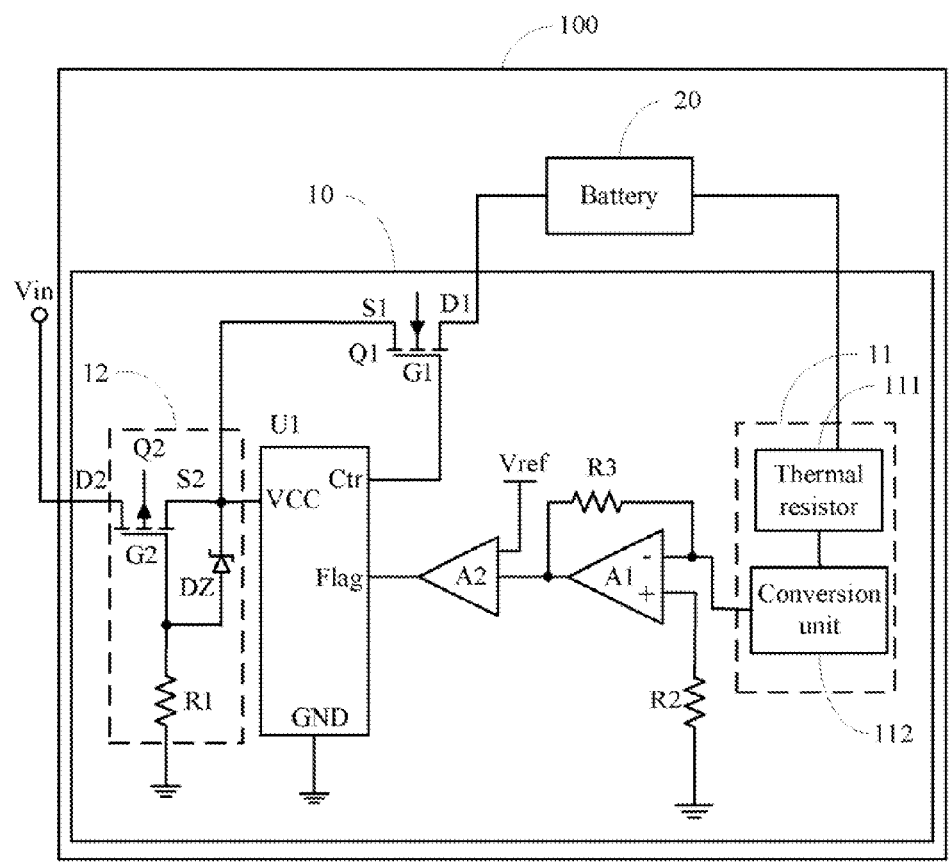

BATTERY PROTECTION CIRCUIT USED IN ELECTRONIC DEVICE

FIELD

Embodiments of the present disclosure relate to protection circuits, and particularly to a battery protection circuit used in an electronic device.

BACKGROUND

Many electronic devices, such as smart phones and tablet computers, include a battery to provide power. During a charging process of the battery, heat can be produced to rise a temperature of the battery. When the battery rises to a high temperature, the battery life may be decreased and the battery can even be damaged if the charging of the battery continues.

BRIEF DESCRIPTION OF THE DRAWINGS

The FIGURE illustrates a schematic circuit diagram of one embodiment of an electronic device including a battery protection circuit.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean "at least one."

The FIGURE shows an electronic device 100 of the embodiment. The electronic device 100 includes a battery protection circuit 10 and a battery 20. The electronic device 100 can be a smart phone, a tablet computer, a mobile Internet device (MID), or other device the like.

In at least one embodiment, the battery protection circuit 10 includes a first switch component Q1, a temperature detection unit 11, an amplifier A1, a comparator A2, a controller U1, and an over voltage protection (OVP) unit 12.

One end of the first switch component Q1 is connected to an input voltage (Vin) via the OVP unit 12, another end of the first switch component Q1 is connected to the battery 20 to charge the battery 20 using the input voltage. The OVP unit 12 disconnects the input voltage and the first switch component Q1 when the input voltage is greater than a predetermined threshold voltage, to protect the battery 20 during the charging process of the battery 20. In other embodiments, the OVP unit 12 can be omitted if the input voltage is a stable voltage. In this embodiment, the first switch component Q1 can be a field effect transistor (FET), which includes a first drain electrode D1, a first source electrode S1, and a first gate electrode G1. The first source electrode S1 is connected to the OVP unit 12, and the first drain electrode D1 is connected to the battery 20.

The OVP unit 12 includes a second switch component Q2 and a diode DZ. The second switch component Q2 can be a TFT, which includes a second drain electrode D2, a second source electrode S2, and a second gate electrode G2. The second drain electrode D2 is connected to the input voltage, the second source electrode S2 is connected to the first source electrode S1 of the first switch component Q1, and the second gate electrode G2 is grounded via a first resistor R1. The diode DZ includes an anode connected to the second gate electrode G2 and a cathode connected to the second source electrode S2. In at least one embodiment, the diode DZ can be a Zener diode having a reverse breakdown voltage. The reverse breakdown voltage is less than or equal to the predetermined threshold voltage.

When the input voltage is connected to the second drain electrode D2, the second switch component Q2 is turned on, to transmit the input voltage to the first switch component Q1 via the second source electrode D2. Thus, the first switch component Q1 is turned on by the input voltage and the battery 20 is charged by the input voltage.

When the input voltage is greater than the predetermined threshold voltage, the diode DZ is broken down to turn off the second switch component Q2, thereby disconnecting the electrical connection between the input voltage and the first switch component Q1 to protect the battery 20.

The temperature detection unit 11 is connected to the battery 20 to detect a temperature of the battery 20 and output the temperature of the battery 20 to the amplifier A1. In at least one embodiment, the temperature detection unit 11 includes a thermal resistor 111 and a conversion unit 112. The thermal resistor 111 is electrically connected to the battery 20 to detect the temperature of the battery 20. The conversion unit 112 is connected between the thermal resistor 111 and the amplifier A1. The conversion unit 112 converts the detected temperature of the battery 20 into a voltage signal and outputs the voltage signal to the amplifier A1.

The amplifier A1 is electrically connected to the comparator A2. The amplifier A1 amplifies the voltage signal and outputs the amplified voltage signal to the comparator A2. The amplifier A1 includes an inverting input port connected to the conversion unit 112 and a noninverting input port grounded via a second resistor R2, and an output port connected to the comparator A2. The inverting input port is connected to the output port via a third resistor R3.

The comparator A2 is electrically connected to the controller U1. The comparator A2 compares the amplified voltage signal with a reference voltage Vref, and outputs a control signal to the controller U1 when the amplified voltage signal is greater than the reference voltage Vref. In this embodiment, it is understood that the temperature of the battery 20 is too high when the amplified voltage signal is greater than the reference voltage Vref.

The controller U1 is electrically connected to the first switch component Q1. When the controller U1 receives the control signal from the comparator A2, the control U1 turns off the first switch component Q1 to stop charging the battery 20. In at least one embodiment, the controller U1 includes a power pin VCC, a control pin Ctr, a signal receiving pin Flag and a ground pin GND. The power pin VCC is electrically connected to the second source electrode S2 of the second switch component Q2 to supply power to the controller U1. The control pin Ctr is electrically connected to the first gate electrode G1 of the first switch component Q1. The signal receiving pin Flag is electrically connected to an output port of the comparator A2 to receive the control signal output from the comparator A2. When the control signal is received from the comparator A2, the controller U1 pulls down a voltage level of the first gate electrode G1 to a low level to turn off the first switch component Q1.

As described above, when the temperature of the battery 20 is too high during the charging processing, the input voltage used to charge the battery 20 can be automatically disconnected from the battery 20 by the first switch component Q1.

Although certain embodiments of the present disclosure have been specifically described, the present disclosure is not to be construed as being limited thereto. Various changes or modifications may be made to the present disclosure without departing from the scope thereof.

What is claimed is:

1. A battery protection circuit of an electronic device having a battery, the battery protection circuit comprising:
a first switch component, a temperature detection unit, an amplifier, a comparator, a controller, and an over voltage protection (OVP) unit, wherein:
the first switch component is connected between an input voltage and the battery, the input voltage charging the battery;
the temperature detection unit is configured to detect a temperature of the battery, convert the temperature into a voltage signal, and output the voltage signal to the amplifier;
the amplifier is connected to the comparator and is configured to amplify the voltage signal and output the amplified voltage signal to the comparator;
the comparator is connected to the controller and is configured to compare the amplified voltage signal with a reference voltage Vref and output a control signal to the controller when the amplified voltage signal is greater than the reference voltage Vref;
the controller is connected to the first switch component and is configured to turn off the first switch component to stop charging the battery when the controller receives the control signal from the comparator; and
the OVP unit is connected between the input voltage and the first switch component and is configured to disconnect the first switch component from the input voltage when the input voltage is greater than a predetermined threshold voltage, wherein the first switch component comprises a first drain electrode, a first source electrode, and a first gate electrode, the first source electrode is connected to the OVP unit, and the first drain electrode is connected to the battery, the OVP unit comprises a second switch component and a diode, the second switch component comprises a second drain electrode, a second source electrode, and a second gate electrode, the second drain electrode is connected to the input voltage, the second source electrode is connected to the first source electrode of the first switch component, and the second gate electrode is grounded via a resistor, the diode comprises an anode connected to the second gate electrode and a cathode connected to the second source electrode.

2. The battery protection circuit according to claim 1, wherein when the input voltage is greater than the predetermined threshold voltage, the diode is broken down to turn off the second switch component, thereby disconnecting an electrical connection between the input voltage and the first switch component to protect the battery.

3. The battery protection circuit according to claim 1, wherein the controller comprises a power pin, a control pin, a signal receiving pin and a ground pin; the power pin is electrically connected to the second source electrode of the second switch component to supply power to the controller, the control pin is electrically connected to the first gate electrode of the first switch component, and the signal receiving pin is electrically connected to the comparator to receive the control signal output from the comparator; when the control signal is received from the comparator, the controller pulls down a voltage level of the first gate electrode to a low level to turn off the first switch component.

4. The battery protection circuit according to claim 1, wherein each of the first switch component and the second switch component is a field effect transistor.

5. The battery protection circuit according to claim 1, wherein the diode is a Zener diode having a reverse breakdown voltage less than or equal to the predetermined threshold voltage.

6. The battery protection circuit according to claim 1, wherein the temperature detection unit comprises a thermal resistor and a conversion unit; the thermal resistor is electrically connected to the battery to detect the temperature of the battery; the conversion unit is connected between the thermal resistor and the amplifier and is configured to convert the detected temperature of the battery into the voltage signal and output the voltage signal to the amplifier.

7. An electronic device, comprising:
a battery; and
a battery protection circuit, the battery protection circuit comprising a first switch component, a temperature detection unit, an amplifier, a comparator, a controller, and an over voltage protection (OVP) unit, wherein:
the first switch component is connected between an input voltage and the battery, the input voltage charging the battery;
the temperature detection unit is configured to detect a temperature of the battery, convert the temperature into a voltage signal, and output the voltage signal to the amplifier;
the amplifier is connected to the comparator and is configured to amplify the voltage signal and output the amplified voltage signal to the comparator;
the comparator is connected to the controller and is configured to compare the amplified voltage signal with a reference voltage Vref and output a control signal to the controller when the amplified voltage signal is greater than the reference voltage Vref; and
the controller is connected to the first switch component and is configured to turn off the first switch component to stop charging the battery when the controller receives the control signal from the comparator; and
the OVP unit is connected between the input voltage and the first switch component and is configured to disconnect the first switch component from the input voltage when the input voltage is greater than a predetermined threshold voltage, wherein the first switch component comprises a first drain electrode, a first source electrode, and a first gate electrode; the first source electrode is connected to the OVP unit, and the first drain electrode is connected to the battery; the OVP unit comprises a second switch component and a diode, the second switch component comprises a second drain electrode, a second source electrode, and a second gate electrode; the second drain electrode is connected to the input voltage, the second source electrode is connected to the first source electrode of the first switch component, and the second gate electrode is grounded via a resistor; the diode comprises an anode connected to the second gate electrode and a cathode connected to the second source electrode.

8. The electronic device according to claim 7, wherein when the input voltage is greater than the predetermined threshold voltage, the diode is broken down to turn off the second switch component, thereby disconnecting an electrical connection between the input voltage and the first switch component to protect the battery.

9. The electronic device according to claim 7, wherein the controller comprises a power pin, a control pin, a signal receiving pin and a ground pin; the power pin is electrically connected to the second source electrode of the second switch component to supply power to the controller, the control pin is electrically connected to the first gate electrode of the first switch component, and the signal receiving pin is electrically connected to the comparator to receive the control signal output from the comparator; when the control signal is received from the comparator, the controller pulls down a voltage level of the first gate electrode to a low level to turn off the first switch component.

10. The electronic device according to claim 7, wherein each of the first switch component and the second switch component is a field effect transistor.

11. The electronic device according to claim 7, wherein the diode is a Zener diode having a reverse breakdown voltage less than or equal to the predetermined threshold voltage.

12. The electronic device according to claim 7, wherein the temperature detection unit comprises a thermal resistor and a conversion unit; the thermal resistor is electrically connected to the battery to detect the temperature of the battery; the conversion unit is connected between the thermal resistor and the amplifier and is configured to convert the detected temperature of the battery into the voltage signal and output the voltage signal to the amplifier.

* * * * *

UNITED STATES PATENT AND TRADEMARK OFFICE
CERTIFICATE OF CORRECTION

PATENT NO. : 9,705,345 B2
APPLICATION NO. : 14/261832
DATED : July 11, 2017
INVENTOR(S) : Zong-Xiao Luo and An-An Pan It is certified that error appears in the above-identified patent and that said Letters Patent is hereby corrected as shown below:

On the Title Page

Please replace Item (73) regarding "Assignees" with the following:
(73) FU TAI HUA INDUSTRY (SHENZHEN) CO., LTD., Shenzhen (CN)
HON HAI PRECISION INDUSTRY CO., LTD., New Taipei (TW)

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*